United States Patent Office 3,424,640
Patented Jan. 28, 1969

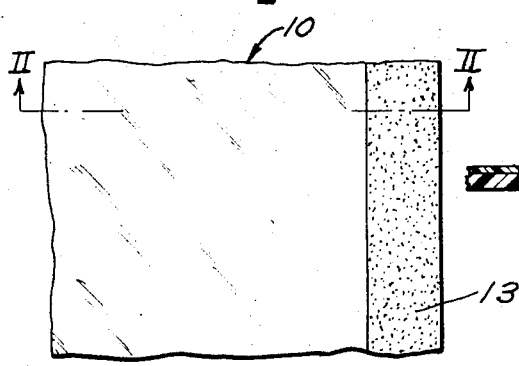
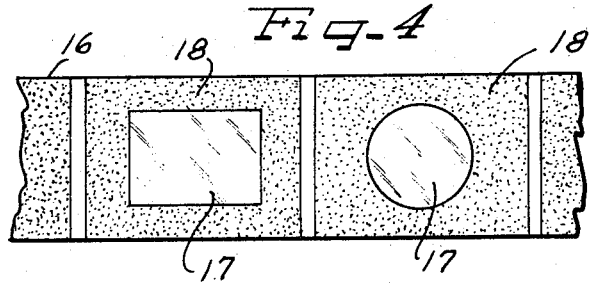

3,424,640
METHOD AND ARTICLE OF CREATING OPAQUE SURFACE ON TRANSPARENT FILMS
Walter Hines, Roselle, William E. Bixby, Deerfield, and Joseph I. Quateman, Evanston, Ill., assignors to Bell & Howell Company, Chicago, Ill., a corporation of Illinois
Filed Aug. 20, 1964, Ser. No. 390,887
U.S. Cl. 161—6          9 Claims
Int. Cl. B44f 1/00; B44d 1/00; D06p 1/00

ABSTRACT OF THE DISCLOSURE

A method and the resulting article of treating a transparent cellulose ester film with a swelling agent comprising a chlorofluoroethane with subsequent treatment of water vapor to render the surface of said film opaque.

---

The present invention relates to a method of providing opaque areas selectively on transparent plastic films or surfaces.

The invention has particular applicability to the treatment of cellulose esters, particularly the acetate, propionate, butyrate, and the mixed esters such as the acetate-butyrate. These materials, either per se, or laminated with tough plastics such as "Mylar" (polyethylene terephthalate) have been extensively used for data recording media, either in the form of punched cards, microfilms, or the like. In many of these applications, it would be desirable to render particular areas of the cellulose ester opaque, such for example, as permitting the reception of ink or type thereon for various purposes. In the case of microfilms, it is sometimes desirable to mask out all but the image to be projected. The technique of the present invention lends itself to that type of masking by providing a means for making the background areas opaque so that only the image is transmitted through the projection system.

It is accordingly an object of the present invention to provide a method for rendering selected areas of a cellulose ester surface opaque.

Another object of the invention is to provide a method for making cellulose ester surfaces, normally transparent and smooth, receptive to inks and typewriter impressions.

Still another object of the invention is to provide an improved laminated business machine card composed of transparent plastic materials and having selected areas thereof rendered opaque.

Still another object of the invention is to provide an improved microfilm in which portions of the film other than the image areas have been selectively treated to make them opaque.

In accordance with the present invention, a transparent cellulose ester film or other surface is rendered opaque by treating the surface of the film with an organic swelling agent and exposing the surface while swollen to water vapor, thereby rendering the surface of the cellulose ester receptive to inks and the like, making it possible to apply legends, data, and other information periodically on those opacified areas.

The preferred organic swelling agents used in accordance with the present invention are the chlorofluoroethanes which are marketed commercially under the trademark "Freon." Specifically, we have found particularly good results by the use of "Freon TA" which is an azeotrope consisting primarily of trichlorotrifluoroethane and acetone. It has a constant boiling temperature of about 112° F., and a kauri-butanol value of about 51. The kauri-butanol value is the number of milliliters of the solvent required to cause cloudiness when added to 20 grams of a solution of 100 grams of kauri-gum in 500 grams of butyl alcohol.

The application of the swelling agent to the cellulose ester surface can be made in a variety of ways. The simplest is merely to immerse the cellulose acetate surface into the solvent for a short period of time (10 seconds to a minute or so) and then exposing it to water vapor or steam while the cellulose ester surface is still swollen. The surface treated in this manner turns white and is completely receptive to writing with pencil, ink, or typewriter ribbon. The degree of opaqueness achieved depends on the time in which the card is immersed in the solvent and also on the humidity the surface is exposed to when removed from the solvent.

It is, of course, possible to apply the solvent by other means such as by spraying, brushing, or roll coating.

The technique for rendering selected areas of a microfilm opaque is substantially as follows. The image is applied to the film in the form of a solvent and water resistant image. Then, the film with the image thereon is treated with the swelling agent, the agent attacking only the non-image areas. After treatment with the swelling agent, the entire film is exposed to water vapor, causing the swollen areas to become opaque, while not affecting the image areas. The microfilm may then be projected in the usual manner onto a suitable screen for viewing.

A further description of the present invention will be made in conjunction with the attached sheet of drawings which illustrates several embodiments.

In the drawings:

FIGURE 1 is a view in elevation of a transparent business machine type card embodying the improvements of the present invention;

FIGURE 2 is a somewhat enlarged cross-sectional view taken substantially along the line II–II of FIGURE 1;

FIGURE 3 is a chart illustrating the steps involved in applying the technique of the present invention to microfilms; and FIGURE 4 is an enlarged fragmentary view of a piece of microfilm embodying the improvements of the present invention.

As shown in the drawings:

In FIGURES 1 and 2, reference numeral 10 indicates generally a business machine type card composed of a laminate consisting of a backing 11 of a tough plastic sheet material such as "Mylar" upon which there is a facing or film 12 consisting of a cellulose ester. Such laminated sheets are readily available commercially. The cellulose ester facing 12 has been treated to provide an opaque area 13 usually white in color, and having a texture which is considerably rougher than the smooth surface of the untreated film. This surface readily receives printing impressions of various natures, as previously explained. The opaque area 13 can be used, for example, for applying legends or data from time to time to keep the card up-to-date.

If desired, the opposed surface of the "Mylar" backing 11 can also be rendered opaque by sandblasting or liquid honing. The latter technique is particularly successful, using abrasive particles on the order of 18 grit.

FIGURE 3 charts the steps involved in the production of a microfilm using the improved technique of the present invention. As indicated, the subject is applied to the film as a microimage in a form in which it is solvent and water resistant. Then, the film is treated with the organic swelling agent and finally with water vapor. Upon drying, the film is ready to be projected through ordinary projection techniques.

The improved microfilm of the present invention is shown in FIGURE 4 at reference numeral 16. Each frame of the film contains an image area 17 which consists of a solvent and water resistant microimage of the original material, surrounded by a nonimage area 18 which has been rendered opaque through the treatment of the present invention.

EXAMPLE

A laminated 3 x 5 card consisting of a "Mylar" backing and a facing of cellulose acetate was immersed into "Freon TA" for 35 seconds. Upon withdrawal from this immersion, the treated surface was exposed to steam, causing the acetate coated surface to become white. Apparently, the steam formed bubbles in the acetate coating and the bubbles so refract the light as to form an opaque section. This section has a considerably coarser texture than the untreated portions of the film, and is receptive to ink, pencil, and typewriter impressions. The degree of opaqueness depends on the time the card is immersed in the swelling agent, and also on the humidity to which the card is exposed when removed from the swelling agent.

We claim as our invention:

1. The method of rendering a transparent cellulose ester film opaque which comprises treating the surface of said film with a chlorofluoroethane and thereafter exposing the surface to water vapor while said surface is swollen from the effects of the treatment.

2. The method of claim 1 in which said cellulose ester is cellulose acetate.

3. The method of claim 1 in which said cellulose ester is cellulose butyrate.

4. The method of claim 1 in which said cellulose ester is cellulose acetate-butyrate.

5. A laminated transparency comprising a backing of a tough transparent resin having a facing of a transparent cellulose ester thereon, said cellulose ester being opaque in at least some areas therein, said areas having been rendered opaque by the process of claim 1.

6. The method of rendering a transparent cellulose ester film opaque which comprises treating the surface of said film with an azeotrope of trichlorotrifluoroethane and acetone and exposing said surface to steam while said surface is swollen from the effects of the treatment.

7. The method of making a projectable transparency which comprises applying a water insensitive microimage onto a surface of a transparent cellulose ester, treating said surface with a chlorofluoroethane to cause the nonimage receiving areas of said surface to become swollen, and treating said surface with water vapor while so swollen to render said nonimage receiving areas opaque while leaving the image areas transparent.

8. The method of claim 7 in which said cellulose ester is cellulose acetate.

9. The method of claim 7 in which said chlorofluoroethane is an azeotrope of trichlorotrifluoroethane and acetone.

References Cited

UNITED STATES PATENTS

| | | | |
|---|---|---|---|
| 2,345,144 | 3/1944 | Opavsky | 264—343 |
| 2,565,491 | 8/1951 | Francis | 156—84 X |
| 2,572,719 | 10/1951 | Ginell et al. | 264—343 X |
| 2,697,893 | 12/1954 | Schaum | 161—2 |
| 2,947,036 | 8/1960 | Anspon | 161—1 X |
| 3,014,301 | 12/1961 | Grupe | 161—6 |

FOREIGN PATENTS 265,924  3/1928  Great Britain.

JACOB H. STEINBERG, *Primary Examiner.*

WILLIAM A. POWELL, *Assistant Examiner.*

U.S. Cl. X.R.

156—83, 277; 161—413; 264—343